Patented Jan. 22, 1929.

1,699,694

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

SULPHUR COMPOSITION AND PROCESS OF MAKING SAME.

No Drawing. Application filed April 4, 1925. Serial No. 20,864.

This invention relates to the preparation and use of a molding composition in which sulphur is used as a binder, particularly to one in which the sulphur is used in a finely divided and preferably dispersed form. The low cost of sulphur and its resistivity to chemical action, as well as its extremly good electrical insulating properties would make it a very desirable binder in the preparation of molded articles were it not for certain defects which have previously been encountered and which in the present invention it is an object to overcome.

The sulphur employed in accordance with the present invention may be the crude mineral or the refined ground sulphur or flowers of sulphur and the like. In order to utilize it under the preferred form of the present invention I grind the sulphur in for example a ball mill with water and a small amount of some agent which tends to aid in the production of a finely divided product, preferably in coarse dispersion. A number of substances having dispersing or emulsifying properties may be employed such as gum tragacanth, starch and the like with or without a small amount of alkali but preferably I employ clays, particularly those of the type of bentonite. Such substances are hereinafter included in the expression "dispersion-assisting substance in which sulphur is insoluble."

Thus a mixture of 9 parts by weight of sulphur, 1 part of bentonite and 20 parts of water may be ground in a ball mill, and after an hour or two of such treatment the sulphur will be found dispersed through the liquid forming a yellow substance of creamy, consistency. Lighter or heavier dispersions may be obtained by increasing or decreasing the amount of water and the thickness of the composition and character of the suspension may be varied by using different proportions of bentonite and by varying the length of time of grinding.

It is not always necessary to use water as the dispersing or suspensory medium as other liquids may be used in some cases.

I use the term "dispersion" throughout the present case, to cover a relatively stable suspension containing extremely minute particles of sulphur in a liquid vehicle in which the said sulphur is insoluble, and which suspension also carries a materal, as herein described, which is very easily wetted by water and which is readily suspendable in water, producing a persistent suspension. The term "dried dispersion" is used by me to cover the product resulting from drying a "dispersion" as defined above and which is dispersable again by mixing with water.

The sulphur in the dispersed form appears to have a greater affinity or attraction for fillers than ordinary sulphur. Whether the dispersed sulphur wets the filler more effectively or just what the mechanism of the action is I am not prepared to say. However in all cases by using the dispersion in place of mixtures of ordinary sulphur and filler I have obtained products of greater strength. Tests of transverse strength in many instances have shown the strength to be almost doubled by using the dispersed sulphur.

In using steel molds it is highly desirable to dry the molding composition thoroughly before molding, as moisture present tends to cause staining of the molds, and in time would injure the surface of the mold considerably.

*Experiment for comparison.*

In one case a molding composition was made by mechanically mixing together 40 parts of sulphur and 60 parts of wood flour. A seemingly good mixture was obtained by grinding all together. This mixture was molded between steel dies at a temperature of 130–140° C. and with the pressure of the press registering 1000 pounds. The mold was kept in the press until the sulphur was melted as indicated by a slight flow along the sides of the die. The mold was then transferred to a cold press and allowed to cool. A molded disc 2 inches in diameter and 3.4 mm. thickness was obtained. This was tested for transverse strength and was found to average 3.43 pounds per mm. The method used of testing for strength was an arbitrary one but it was used throughout the investigations and serves to give comparative results.

*Example 1.*

A second molding composition was made by grinding sulphur, bentonite and water together in the proportions stated above (9:1:20) and drying to get the sulphur in a powdered form interspersed with the bentonite. 40 parts of the dry sulphur dispersion were mixed with 60 parts of wood flour. On molding in the same manner as indicated above the average strength of several samples tested in like manner was 4.73 pounds per mm. The sulphur which has been dispersed and then dried and mixed with a filler therefore has an increased strength (about 35% increase in this case).

*Example 2.*

On the other hand if the filler is mixed with with the sulphur dispersion while wet the strength is still higher. In one case 90 parts of sulphur, 10 parts of bentonite and 200 parts by weight of water were ground in a pebble mill, yielding a sulphur dispersion in the form of a thin paste. Enough of this paste was mixed with wood flour to yield the proportion of 40 parts sulphur and 60 parts of wood flour. The ingredients were thoroughly worked together and then well dried in an electric oven at 90–100° C. The dried composition was molded in the manner outlined above and the strength of the samples averaged 5.56 pounds per mm., (about 62% increase in strength).

The use of dispersed sulphur as a binder in the preparation of molding compositions is of course not limited to a wood flour filler. Better results from the standpoint of resistance to water, acids and the like are obtained by using mineral fillers, particularly asbestos fibre with which may be incorporated mica dust, terra alba and the like.

*Example 3.*

A composition prepared with wood flour has no great water resistance and is therefore limited to such use as does not require exposure to moisture. With asbestos fibre a product can be obtained which is water resistant and considerably stronger than one obtained from wood flour. Test discs prepared as herein outlined but using an asbestos filler gave an average comparative strength of about 8 pounds.

*Example 4.*

90 parts of sulphur, 10 parts of bentonite and 200 parts by weight of water were ground in a ball mill for 2 hours. 100 parts of this dispersion equivalent to approximately 30 parts of sulphur were thoroughly mixed with 45 parts of long fibred asbestos. The mixture was dried at 90–100° C. and then ground. The composition when pressed at 1000 pounds and a temperature of 130° C. showed in one case a strength of 9.4 pounds per mm., (about 160% increase in strength over the comparative sample first above noted).

Varying the proportion of the sulphur tends to modify the strength. With 30 per cent of sulphur the strength in one case was 7.8 pounds per mm., with 40 per cent sulphur, 8 pounds per mm., and with 50 per cent sulphur, 6.8 pounds per mm.

Of course differences in the character of the filler, amount of asbestos fibre employed and length of fibre all influence the strength. Also it should be noted that sulphur which has been melted changes on standing from one crystalline form to another and its strength varies to some extent with the degree of such change.

*Example 5.*

A mixture made from mica dust 45.7 per cent, short fibred asbestos 5.7 per cent, long fibred asbestos 8.6 per cent and a quantity of sulphur-bentonite dispersion equivalent to 3.3 per cent of bentonite and 40 per cent of sulphur gave a strength of 5.5 pounds per mm.

*Example 6.*

A molded article made from a composition containing equal parts of the dispersed sulphur and long fibred asbestos exposed to the weather for several weeks did not show any effect.

The use of sulphur in an undispersed form in conjunction with the dispersed sulphur is not precluded. It is possible to melt sulphur and a mineral filler for example asbestos, cool and grind, add a further quantity of sulphur in the dispersed form, dry thoroughly to a moisture content below that at which the composition would stain steel dies and employ this composition for molding operations.

One use to which I propose to apply the present invention is in making advertising signs. It is possible to mold signs with raised or depressed letters, trade marks and the like from the asbestos sulphur composition. Strength and durability can thus be obtained. The strength is further enhanced by molding the mixture on pressboard or pulp board. The latter may first be waterproofed in any desired manner, preferably by impregnating with molten sulphur. The board is then placed in a press, a layer of the molding composition spread over it and the hot die brought down upon the mass to cause the composition to adhere firmly to the paper board backing and at the same time embossing the letters or markings constituting the advertisement. Paper board which has absorbed at least its own weight of sulphur by impregnation with molten sulphur is satisfactory. The sulphur-containing molding composition applied to such a board may be suitably colored with pigments or dyes.

After the sign has thus been prepared any part of its may be painted for example if letters have been embossed upon the sign these may be painted in one color with the background another. Aluminum paint is satisfactory for the purpose. Ordinary varnishes do not adhere so well to the sulphurized material as coatings having a nitrocellulose base and my finished sign board therefore preferably is one which has been painted with nitrocellulose lacquer enamels.

In cases where the advertising device is not exposed to the weather or where the product is to be employed in other ways it is not necessary to impregnate the pressboard with sulphur or other waterproofing substances and under such conditions I may use the unwaterproofed pressboard as a backing or support for a thin or thick layer of the sulphur plastic, molded thereon and suitably embossed according to requirements.

No claim is made herein to the use of solutions of sulphur in volatile solvents, such as carbon bisulphide, for impregnating the filler. Such solvents would be expensive and would produce solutions instead of dispersions of the sulphur.

What I claim is:—

1. A dried composition comprising a dried dispersion of extremely finely divided sulphur and a substance of the group composed of starch, gum tragacanth and highly colloidal clay which is capable of acting as a dispersing agent for such sulphur, which dried dispersion is capable of being mixed with water to again produce a dispersion, together with a filler, which composition when molded by hot pressing affords a molded article of a strength greater than that exhibited when undispersed sulphur is substituted for the dispersed sulphur.

2. Articles shaped by hot pressing the composition of claim 1.

3. A plastic composition comprising dispersed sulphur and clay material well incorporated with fibrous material, such composition giving, upon hot molding, articles substantially stronger than would be produced from undispersed sulphur, clay material and fibrous material, all of the same grade and quality and in the same proportions, under like molding conditions.

4. A plastic composition comprising dispersed undissolved sulphur and a substance of the group composed of starch, gum tragacanth and highly colloidal clay, well incorporated with fibrous material, such composition giving, upon hot molding, articles substantially stronger than would be produced from undispersed sulphur, the dispersion-assisting substance and fibrous material, all of the same grade and quality and in the same proportions, under like molding conditions.

5. A process which comprises wet-grinding sulphur and a dispersion-assisting substance and mixing the dispersed sulphur with a filler material and drying at any stage of said treatment.

6. A process which comprises wet-grinding sulphur and a dispersion-assisting substance and mixing the dispersed sulphur with a mineral filler material and thereafter drying.

7. A process which comprises wet-grinding sulphur and a dispersion-assisting substance and mixing the dispersed sulphur with a fibrous filler material and drying at any stage of the said treatment.

8. A dispersion comprising sulphur, bentonite and water.

9. A dispersion in a liquid vehicle which is not a solvent for sulphur, containing sulphur and bentonite.

CARLETON ELLIS.